(12) United States Patent
Rauh et al.

(10) Patent No.: US 8,249,779 B2
(45) Date of Patent: Aug. 21, 2012

(54) DEVICE AND METHOD FOR ACTIVATING PASSENGER PROTECTION MEANS

(75) Inventors: Christian Rauh, Munich (DE); Ralf Walther, Bad Zwischenahn (DE)

(73) Assignee: Robert Bosch GmbH, Stuttgart (DE)

( * ) Notice: Subject to any disclaimer, the term of this patent is extended or adjusted under 35 U.S.C. 154(b) by 573 days.

(21) Appl. No.: 12/302,496

(22) PCT Filed: Jul. 9, 2007

(86) PCT No.: PCT/EP2007/056994
§ 371 (c)(1),
(2), (4) Date: Apr. 8, 2009

(87) PCT Pub. No.: WO2008/019914
PCT Pub. Date: Feb. 21, 2008

(65) Prior Publication Data
US 2010/0017068 A1    Jan. 21, 2010

(30) Foreign Application Priority Data
Aug. 18, 2006  (DE) .......................... 10 2006 038 844

(51) Int. Cl.
*B60R 22/00*    (2006.01)
(52) U.S. Cl. .......................................... 701/45; 701/47
(58) Field of Classification Search .................... 701/45, 701/47
See application file for complete search history.

(56) References Cited

U.S. PATENT DOCUMENTS

| | | | | |
|---|---|---|---|---|
| 6,529,810 | B2 * | 3/2003 | Foo et al. | 701/45 |
| 6,728,604 | B2 * | 4/2004 | Ugusa et al. | 701/1 |
| 7,625,006 | B2 * | 12/2009 | Foo et al. | 280/735 |
| 7,702,441 | B2 * | 4/2010 | Geborek et al. | 701/45 |
| 7,744,123 | B2 * | 6/2010 | Foo et al. | 280/735 |
| 7,761,206 | B2 * | 7/2010 | Sawahata | 701/45 |
| 7,840,325 | B2 * | 11/2010 | Foo et al. | 701/45 |
| 7,848,885 | B2 * | 12/2010 | Hayasaka | 701/301 |
| 7,896,392 | B2 * | 3/2011 | Oowada et al. | 280/735 |
| 7,930,080 | B2 * | 4/2011 | Uono et al. | 701/45 |

FOREIGN PATENT DOCUMENTS

| | | |
|---|---|---|
| DE | 198 55 452 | 6/2000 |
| DE | 10 2005 020 146 | 6/2006 |
| EP | 0 305 654 | 3/1989 |
| WO | WO 2006/018333 | 2/2006 |

OTHER PUBLICATIONS

International Search Report, PCT/EP2007/056994, dated Oct. 22, 2007.

* cited by examiner

*Primary Examiner* — Toan To
(74) *Attorney, Agent, or Firm* — Kenyon & Kenyon LLP

(57) ABSTRACT

In a method and a device for activating passenger protection device(s), the passenger protection device(s) are activated as a function of a first signal of an acceleration sensor system and a second signal of a structure-borne noise sensor system. The activation is decided as a function of a position of a vector composed of at least two features of the first signal in relation to a characteristic curve, the characteristic curve being modified as a function of the second signal.

20 Claims, 4 Drawing Sheets

DEVICE AND METHOD FOR ACTIVATING PASSENGER PROTECTION MEANS

FIELD OF THE INVENTION

The present invention relates to a device and a method for activating passenger protection device(s).

BACKGROUND INFORMATION

To activate passenger protection means as a function of an acceleration-based algorithm and a structure-borne noise signal is known from M. Feser, C. Wieland, C. Schmidt, and T. Brandmeier: Crash Impact Sound Sensing (CISS)—Higher Crash Discrimination Performance at Lower Cost, Airbag 2004. This should make it possible to better detect a head-on crash and make the triggering decision more robust for critical situations. In addition, the introduction of the structure-borne noise sensor system should make the overall system more cost-effective.

SUMMARY

The device according to example embodiments of the present invention for activating passenger protection device(s) and the method according to example embodiments of the present invention for activating passenger protection device(s) have the advantage that a time-independent algorithm is used for the acceleration signals which has a particular quality regarding accident detection, accident severity determination, and accuracy. This is due to the fact that a vector is used which has features as components which are derived from the acceleration signal, but not the time.

In particular, the device according to example embodiments of the present invention and the method according to example embodiments of the present invention make good compatibility with a current algorithm and a high degree of modularity possible, because the effect of the structure-borne noise signal caused by modifying the threshold value may or may not be used. This means a switch from a system taking into account the structure-borne noise to a system not taking into account the structure-borne noise is possible at very low costs.

According to example embodiments of the present invention, the robustness is also improved because the main decision is based on the well-tried low-frequency signals of the acceleration signals since this low frequency signal represents a causal relationship between the signal and the injury severity of the passenger.

An aspect hereof is to modify the characteristic curve in the acceleration-based algorithm as a function of the structure-borne noise signal. In doing so, a vector, made up of features from the acceleration signal, is compared with the characteristic curve in order to bring about the triggering decision. This means that a field is defined having at least two features which are derived from the low-frequency acceleration signal. At least one section, which is a triggering event, is defined in the field by the characteristic curve, i.e., when the value pair is situated in this section.

Advantageous is the use of an integrator for forming the single or the double integral of the acceleration signal for forming the two features since these are variables that may be well-analyzed and for which a substantial empirical know-how exists.

It is furthermore advantageous that the feature from the structure-borne signal is generated by band-pass filtering and a subsequent envelope formation. The envelope formation may be achieved via an absolute-value generation and low-pass filtering.

The integrator, the filters, and the absolute-value generation may be implemented as software modules on the analyzing circuit or as hardware. Hardware components are faster than software modules, but are less flexible in the adaptation.

It is particularly advantageous that the acceleration sensor system and the structure-borne noise sensor system are arranged in a single sensor system, the separation of the signals being achieved via a filter since the acceleration signals are the low-frequency signals and the structure-borne noise signals are the high-frequency signals. It is alternatively possible to use different sensors. These sensors may then be placed in the control unit or in the vehicle according to their application area. It is advantageous to install these separate sensors in one structural unit, the control unit housing being the structural unit and the sensors being situated on a shared printed-circuit board.

It is a further advantage to pre-process the structure-borne noise signal such that the sensor output signal having a reduced sampling rate may be emitted. This pre-processing may be advantageous band-pass filtering and a suitable envelope formation, for example. This generates a signal using which the characteristic curve for separating the triggering cases and the non-triggering cases in the space of the features derived from the low-frequency signal component is ultimately modified.

if integration is mentioned, it means integration which is possible with the use of an arithmetic unit, i.e., a summation or also a mean value formation if it should be divided by the time.

A suitable implementation of the above-mentioned determination of the envelopes may be achieved advantageously by sequential generation of the absolute value and subsequent low-pass formation.

Moreover, it is an advantage that the analyzing circuit, based on the value pair composed of the acceleration signal and the once- or twice-integrated acceleration signal, additionally determines by comparison with a further characteristic curve whether there is even a triggering case or a so-called misuse case, i.e., a collision which, however, should not result in triggering of passenger protection device(s).

Furthermore, improved misuse robustness may be achieved in a suitable manner by additionally taking the high-frequency signal component into account.

Based on the acceleration signal, it is advantageously possible to determine a movement of a passenger of the vehicle, the analyzing circuit, i.e., a microcontroller, for example, determining the triggering time for the passenger protection device(s) as a function of the movement. This prediction of the movement of the passenger of the vehicle may be ascertained via Taylor's series expansion in particular. This Taylor's series expansion may already be stopped after the third term. The Taylor's series expansion is normalized to the road so that the velocity, i.e., the first integral acceleration, is multiplied by the time and the acceleration is multiplied by the square of the time.

Exemplary embodiments of the present invention are illustrated in the drawing and are explained in greater detail in the following description.

DETAILED DESCRIPTION

Figure 1:
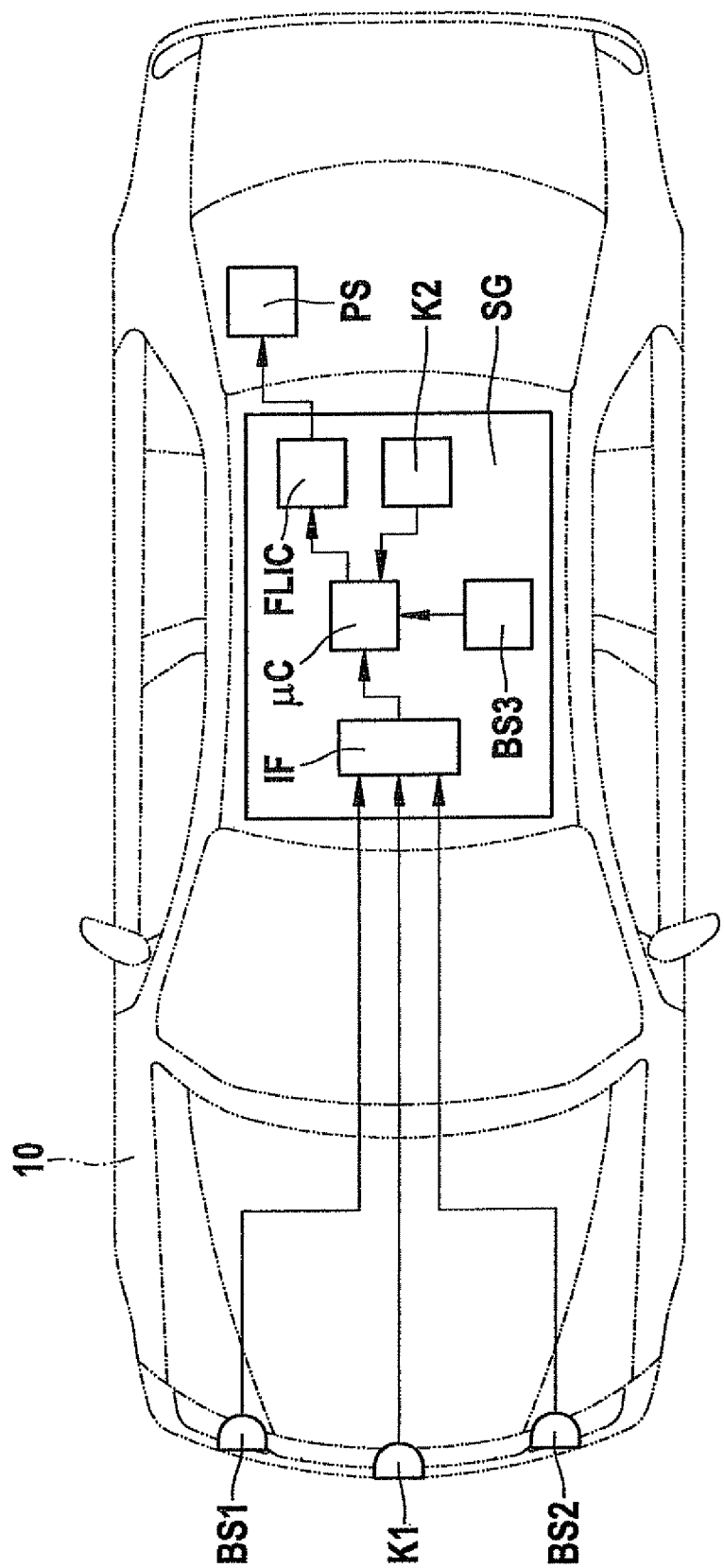
FIG. 1 shows a block diagram of the device according to an example embodiment of the present invention.

FIG. 1 shows a block diagram of the device according to an example embodiment of the present invention in a vehicle. Vehicle 10 has two acceleration sensors BS1 and BS2 on its front end which are situated behind the bumper cover in a suitable manner. These acceleration sensors BS1 and BS2 have a micromechanical element which, for example, changes its capacitance under the effect of acceleration and this capacitance change is then amplified and digitized. The data created in this way are then transferred to a control unit SG in vehicle 10, i.e., to its interface module IF. Instead of two acceleration sensors BS1 and BS2, more than these two acceleration sensors may also be installed in the vehicle front, for example 3 or 4 or also only one single acceleration sensor. It is also possible to totally omit the acceleration sensors in the front. A structure-borne noise sensor K1 is additionally installed in the vehicle front which also may be an acceleration sensor. Structure-borne noise signals are transmitted from structure-borne noise sensor K1 to interface module IF of control unit SG. It is possible here also to use more than one structure-borne noise sensor or to totally omit structure-borne noise sensor K1.

The transmission of the sensors to control unit SG is typically a power line data transfer, individual lines being used here for each sensor. However, it is possible that the sensors are situated on a bus or a quasi-bus. From the interface module, of which there may be more than one, the sensor data are transferred to the analyzing circuit, i.e., to microcontroller μC, via the SPI bus, for example. Instead of a microcontroller, ASICs or also microprocessors may be used. Microcontroller μC also receives data from sensors within control unit SG, namely from acceleration sensor BS3, which is sensitive in the vehicle's longitudinal direction, and from structure-borne noise sensor K2. As a function of all these data, microcontroller μC computes the activation algorithm as described in the following and activates ignition circuit FLIC as a function thereof. Microcontroller μC has at least one integrator, one band-pass filter, one low-pass filter and one absolute-value generator as software modules for the method according to example embodiments of the present invention for processing the sensor signals. Furthermore, a module is provided for forming the vector.

If this ignition circuit FLIC is activated, then the ignition circuit supplies an ignition current to the passenger protection device(s) such as airbags or seat belt tighteners. For this purpose, ignition circuit FLIC is connected to passenger protection device(s) PS which are distributed in the vehicle. Passenger protection device(s) PS may also include pedestrian protection device(s) such as a liftable front hood or outside airbags. By using structure-borne noise sensor systems K1 and K2, which may be combined with appropriate acceleration sensors, the structure-borne noise signal may thus be separated from the acceleration signal, which is low-frequency, via a filter.

Figure 2:
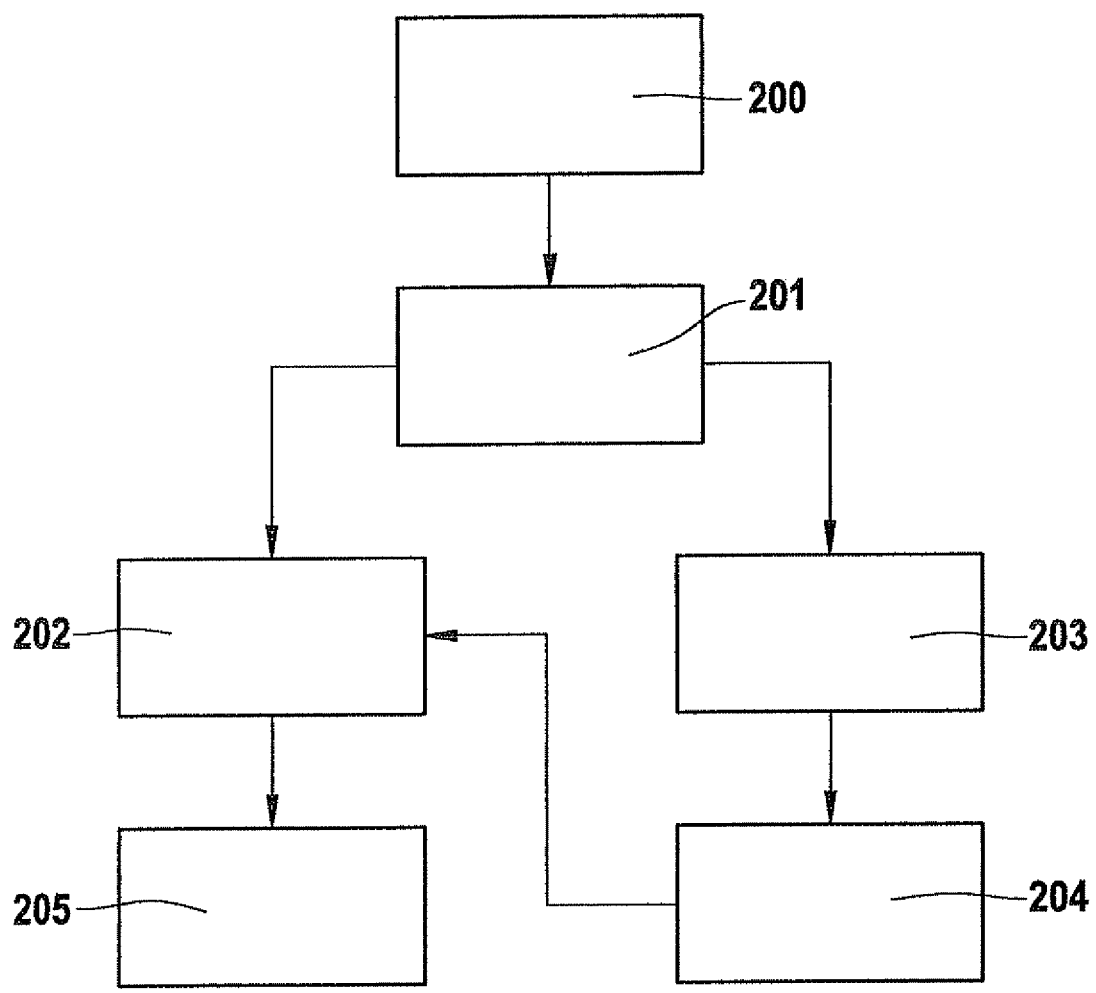
FIG. 2 shows a flow chart.

FIG. 2 describes the sequence of the method according to example embodiments of the present invention. The signal is picked up in method step 200. If the same sensor is used for detecting the acceleration signal and the structure-borne noise signal, filtering takes place in method step 201. The acceleration signal is then supplied to algorithm 202 which possibly results in triggering 205. The high-frequency structure-borne noise signal is processed in method step 203 in the manner explained below and results in a modification of the first characteristic curve in method step 204. Free intervention in the algorithm is thus easily possible and it is clear that this function of the structure-borne noise sensor system is modular.

For plausibility reasons it may be provided that two sensors are used during filtering.

Figure 3:
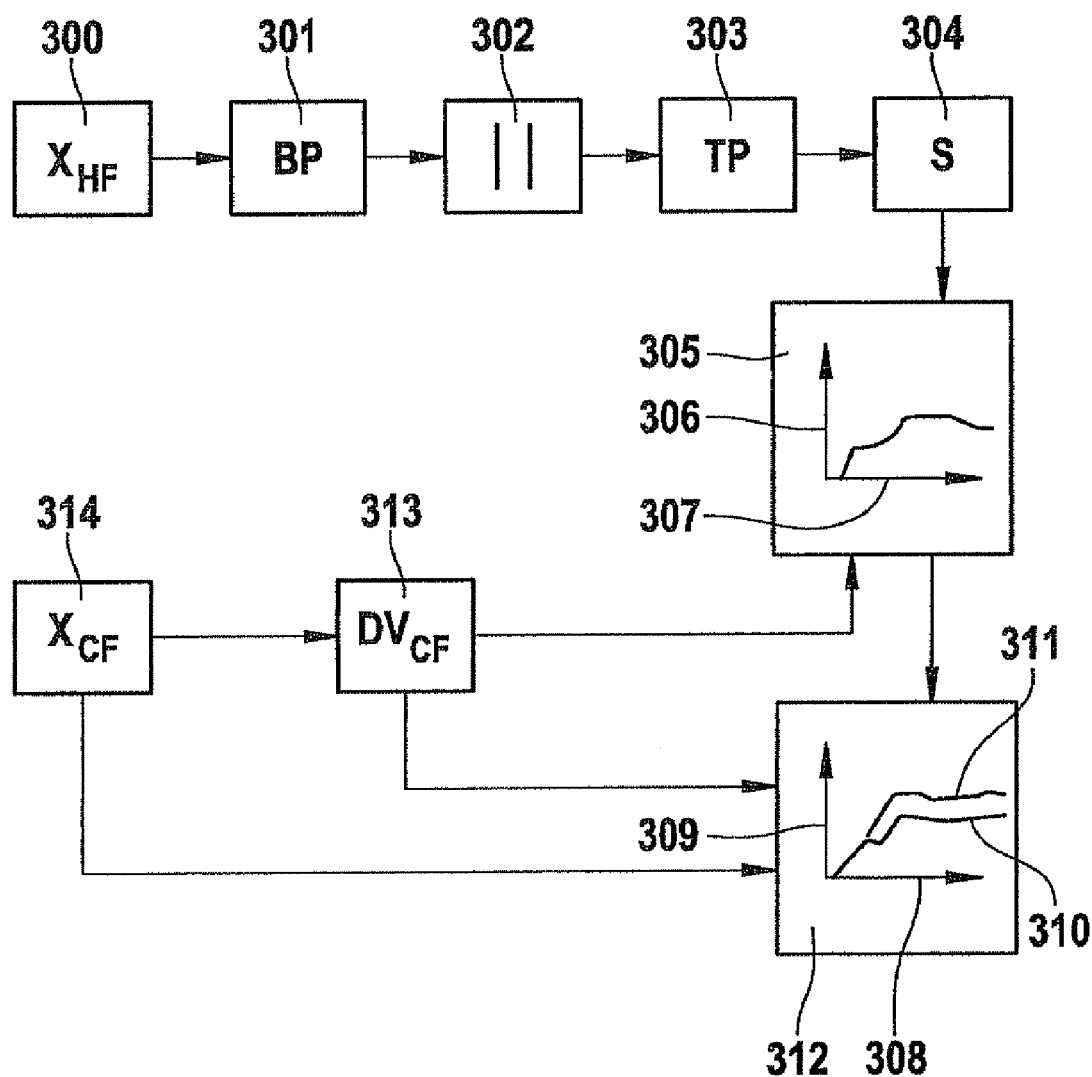
FIG. 3 shows a signal curve diagram.

FIG. 3 shows the method according to example embodiments of the present invention in a further sequence diagram. A high-frequency signal is filtered out in method step 300 and is in turn subjected to a band-pass in method step 301. The signal is then subjected to an absolute-value generation in method step 302. Low-pass filtering of this signal is carried out in method step 303. The signal generated in this manner may then advantageously be integrated in method step 304, thereby creating the third signal or the third feature. The third signal created in this manner is then depicted in a forward displacement acceleration diagram in sequence step 305. Based on this comparison, also with a characteristic curve, it is determined how the characteristic curve for the main algorithm is modified. The forward displacement or velocity 307 is obtained from block 313 which supplies the velocity for the low-frequency signal. The corresponding acceleration is made available in block 314. These two variables are supplied to block 312 which depicts acceleration 309 to forward displacement 308. The two curves 310 and 311 can be clearly seen, curve 311 being raised as a function of the signal from block 305.

Figure 4:
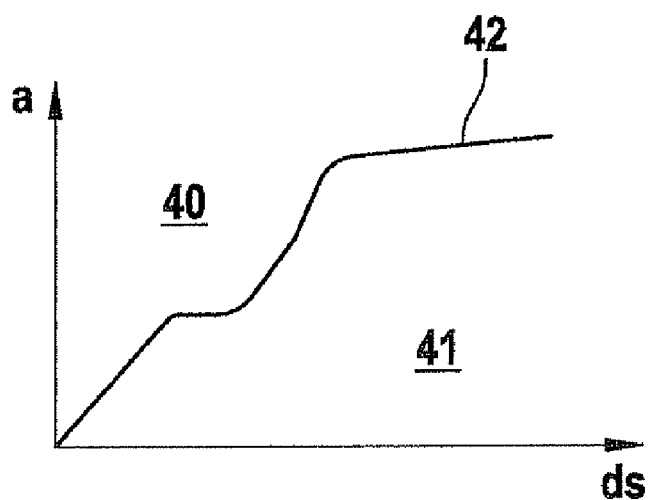
FIG. 4 shows an acceleration forward displacement diagram.
Figure 5:
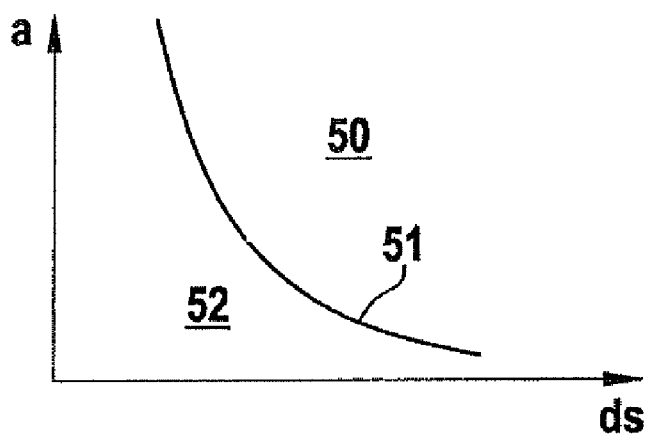
FIG. 5 shows another acceleration forward displacement diagram.

FIG. 4 shows an acceleration forward displacement diagram. Characteristic curve 42 separates crash 40 from non-crash 41. A further acceleration forward displacement diagram is explained in FIG. 5, a distinction being made here between erroneous triggering 52, where passenger protection device(s) PS are not to be triggered, and triggering case 50. These two areas are separated by characteristic curve 51.

What is claimed is:

1. A device for activating a passenger protection device, comprising:
    an analysis circuit adapted to activate the passenger protection device as a function of a first signal of an acceleration sensor system and a second signal of a structure-borne noise sensor system;
    wherein the analysis circuit is adapted to determine an activation as a function of a position of a vector composed of at least two first features, which are formed using the first signal, in relation to a characteristic curve, the characteristic curve being modified as a function of the second signal.

2. The device according to claim 1, wherein the analysis circuit has an integrator adapted to form the at least two first features which are usable for at least one of (a) a single and (b) a double integration of the first signal.

3. The device according to claim 1, wherein the characteristic curve is modified as a function of at least one second feature of the second signal, the analysis circuit having a band-pass filter and subsequent envelope formation to form at least one second feature.

4. The device according to claim 3, wherein the analysis circuit has an absolute-value generator and a low-pass formation for envelope formation.

5. The device according to claim 1, wherein the acceleration sensor system and the structure-borne noise sensor system are arranged in a single sensor system, a separation between the first signal and the second signal being implemented via filters.

6. The device according to claim 1, wherein the acceleration sensor system and the structure-borne noise sensor system are arranged in separate sensor systems, the acceleration sensor system and the structure-borne noise sensor system being provided in one structural unit.

7. The device according to claim 1, wherein the analysis circuit is adapted to determine whether a triggering case exists in accordance with a vector and a comparison with a second characteristic curve.

8. The device according to claim 1, wherein the analysis circuit is adapted to determine a movement of a passenger of the vehicle based on the first signal, the analysis circuit adapted to determine a triggering time for the passenger protection device as a function of the movement.

9. A method for activating a passenger protection device, comprising:
activating the passenger protection device as a function of a first signal of an acceleration sensor system and a second signal of a structure-borne noise sensor system; wherein the activation is decided as a function of a position of a vector composed of at least two first features, which are formed using the first signal, in relation to a characteristic curve, the characteristic curve being modified as a function of the second signal.

10. The method according to claim 9, wherein the at least two first features are determined in accordance with at least one of (a) single and (b) double integration.

11. The method according to claim 9, wherein the characteristic curve is modified as a function of at least one second feature, the at least one second feature being generated from the second signal in accordance with band-pass filtering and subsequent envelope formation.

12. The method according to claim 11, wherein the envelope formation is achieved in accordance with absolute-value generation and low-pass filtering.

13. The method according to claim 9, wherein the acceleration sensor system and the structure-borne noise sensor system are arranged in a common sensor system, a separation of the first and the second signal being achieved by filtering.

14. The method according to claim 9, wherein, based on a vector and a comparison with a second characteristic curve, it is additionally determined whether a triggering case exists.

15. The method according to claim 9, wherein, based on the first signal, a movement of a passenger of the vehicle is determined, a triggering time being determined for the passenger protection device as a function of the movement.

16. The method according to claim 9, wherein the at least two first features are determined in accordance with at least one of (a) single and (b) double integration, and wherein the acceleration sensor system and the structure-borne noise sensor system are arranged in a common sensor system, a separation of the first and the second signal being achieved by filtering.

17. The method according to claim 16, wherein the characteristic curve is modified as a function of at least one second feature, the at least one second feature being generated from the second signal in accordance with band-pass filtering and subsequent envelope formation, and wherein the envelope formation is achieved in accordance with absolute-value generation and low-pass filtering.

18. The method according to claim 17, wherein the acceleration sensor system and the structure-borne noise sensor system are arranged in a common sensor system, a separation of the first and the second signal being achieved by filtering.

19. The method according to claim 9, wherein the characteristic curve is modified as a function of at least one second feature, the at least one second feature being generated from the second signal in accordance with band-pass filtering and subsequent envelope formation, and wherein the envelope formation is achieved in accordance with absolute-value generation and low-pass filtering.

20. The method according to claim 9, wherein, based on a vector and a comparison with a second characteristic curve, it is additionally determined whether a triggering case exists, wherein, based on the first signal, a movement of a passenger of the vehicle is determined, a triggering time is determined for the passenger protection device as a function of the movement, and wherein the acceleration sensor system and the structure-borne noise sensor system are arranged in a common sensor system, a separation of the first and the second signal being achieved by filtering.

* * * * *